(12) United States Patent
Kalkbrenner et al.

(10) Patent No.: US 9,671,603 B2
(45) Date of Patent: Jun. 6, 2017

(54) OPTICAL ARRANGEMENT AND LIGHT MICROSCOPE

(71) Applicant: Carl Zeiss Microscopy GmbH, Jena (DE)

(72) Inventors: Thomas Kalkbrenner, Jena (DE); Ralf Netz, Jena (DE); Ingo Kleppe, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/427,276

(22) PCT Filed: Aug. 2, 2013

(86) PCT No.: PCT/EP2013/066308
§ 371 (c)(1),
(2) Date: Mar. 10, 2015

(87) PCT Pub. No.: WO2014/040799
PCT Pub. Date: Mar. 20, 2014

(65) Prior Publication Data
US 2015/0301325 A1    Oct. 22, 2015

(30) Foreign Application Priority Data
Sep. 11, 2012 (DE) .................. 10 2012 017 920

(51) Int. Cl.
*G02B 21/36* (2006.01)
*G02B 21/00* (2006.01)
(Continued)

(52) U.S. Cl.
CPC ....... *G02B 21/361* (2013.01); *G02B 21/0044* (2013.01); *G02B 21/0076* (2013.01);
(Continued)

(58) Field of Classification Search
CPC .............. G02B 21/361; G02B 21/0044; G02B 21/0076; G02B 21/0092; G02B 21/06; G02B 21/367; G02B 27/58
(Continued)

(56) References Cited

U.S. PATENT DOCUMENTS

2008/0069467 A1* 3/2008 Schafer .................. G02B 21/06
382/254
2009/0128898 A1* 5/2009 Wolleschensky .... G02B 21/002
359/385

(Continued)

FOREIGN PATENT DOCUMENTS

DE     10 2007 018048 A1    10/2008
DE     10 2010 062341 A1     6/2012
(Continued)

OTHER PUBLICATIONS

English translation of Notification of Transmittal of Translation of the International Preliminary Report on Patentability (Chapter I or Chapter II).
(Continued)

*Primary Examiner* — Frank Font
(74) *Attorney, Agent, or Firm* — Duane Morris LLP (57) ABSTRACT

An optical arrangement for positioning in a beam path of a light microscope, has an optical carrier, on which a first set of optical assemblies for generating structured illumination light of different orientations is arranged. The optical arrangement includes an adjustable deflection device provided for selectably deflecting a light beam to one of the optical assemblies and for deflecting one light beam coming from said optical assembly into the direction of a sample that is to be examined. The invention further relates to a light microscope having an optical arrangement according to the invention.

21 Claims, 3 Drawing Sheets

(51) Int. Cl.
*G02B 21/06* (2006.01)
*G02B 27/58* (2006.01)

(52) U.S. Cl.
CPC ......... *G02B 21/0092* (2013.01); *G02B 21/06* (2013.01); *G02B 21/367* (2013.01); *G02B 27/58* (2013.01)

(58) Field of Classification Search
USPC .................................................. 359/386, 385
See application file for complete search history.

(56) References Cited

U.S. PATENT DOCUMENTS

| | | | |
|---|---|---|---|
| 2009/0168158 A1* | 7/2009 | Schwertner | G02B 21/0024 359/385 |
| 2009/0224174 A1* | 9/2009 | Netz | G01M 11/0264 250/459.1 |
| 2009/0237501 A1* | 9/2009 | Lemmer | G01N 21/6428 348/79 |
| 2010/0108873 A1 | 5/2010 | Schwertner | |
| 2010/0157422 A1 | 6/2010 | Ouchi et al. | |
| 2011/0194175 A1* | 8/2011 | Dougherty | G01N 21/6458 359/386 |
| 2011/0267688 A1* | 11/2011 | Kleppe | G02B 21/0036 359/385 |
| 2013/0100525 A1* | 4/2013 | Chiang | G02B 21/082 359/385 |
| 2014/0111633 A1 | 4/2014 | Kalkbrenner et al. | |

FOREIGN PATENT DOCUMENTS

| | | | |
|---|---|---|---|
| EP | 1 617 252 A1 | 1/2006 | |
| EP | 2 136 233 A1 | 12/2009 | |
| WO | WO 96/24082 | 8/1996 | |
| WO | WO 2012099521 A1 * | 7/2012 | ......... G02B 21/0048 |
| WO | WO 2012/118436 A1 | 9/2012 | |
| WO | WO 2012/118530 A1 | 9/2012 | |

OTHER PUBLICATIONS

Gustafsson, Mats G.L., et al; "Doubling the lateral resolution of wide-field fluorescence microscopy using structured illumination"; Proceedings of SPIE 2000; 3919:141-150.

Heintzmann, R., et al.; "Laterally Modulated Excitation Microscopy: Improvement of resolution by using a diffraction grating"; SPIE 1998; 3568:185-196.

Heintzmann, Rainer, et al.; "Saturated patterned excitation microscopy—a concept for optical resolution improvement"; J. Opt. Soc. Am. A. 2002; 19(8):1599-1609.

Lukosz, von W, et al.; "Optischen Abbildung unter Uberschreitung der beugungbedingten Auflosungsgrenze"; Physikalisches Institut, Technische Hochschule 1963; 241-255.

Shao, Lin, et al.; "Super-resolution 3D microscopy of live whole cells using structured illumination"; Nature Methods 2011; 8(12):1044-1046.

* cited by examiner

OPTICAL ARRANGEMENT AND LIGHT MICROSCOPE

RELATED APPLICATIONS

The present application is a U.S. National Stage application of International PCT Application No. PCT/EP2013/066308 filed on Aug. 2, 2013 which claims priority benefit of German Application No. DE 10 2012 017 920.0 filed on Sep. 11, 2012, the contents of each are incorporated by reference in their entirety.

FIELD OF THE INVENTION

In a first aspect, the present invention relates to an optical arrangement for positioning in a radiation path of a light microscope according to the preamble of claim 1. In another aspect the invention relates to a light microscope according to the preamble of claim 19.

A generic light microscope comprises a sample plane, in which a sample to be examined can be positioned, and at least one light source for emitting a light beam in the direction towards the sample plane. Light coming from the sample can then be proven for generating a sample image using a light detector.

A method known for examining a sample with high resolution is microscopy using structured illumination (structured illumination microscopy, SIM). Here, one or more diffraction gratings are inserted into a radiation path of a light microscope between the light source and the sample plane. This way, an image of the grating is generated in the sample plane. When sample images are recorded concerning various alignments of the grating, a sample image with increased resolution can be calculated therefrom.

BACKGROUND OF THE INVENTION

In general, structured illumination light may be understood as any light with a spatially variable distribution of intensity over the cross-section of the light beam. In particular, light with a periodic distribution of intensity over the cross-section can be used, for example, a linear patterns with illuminated and not-illuminated lines.

Such a pattern can be generated by a linear grating on the sample plane.

Various methods are known to provide different grating orientations. In principle, a single grating may be used and rotated into different orientations. In addition to a grating, optic image field rotators may also be used, for example an Abbe-König prism. This way, a rotation of the image field and thus a rotation of the cross-sectional area of a light beam can be generated. Furthermore, several differently aligned gratings may be provided, with it being possible to select respectively one of them by a motorized grating exchanger. Additionally, an optic beam splitting can occur to generate interfering radiation or superimposed, differently aligned gratings may be provided on a substrate and means for selecting a desired diffraction order.

In a generic optical arrangement, an optic carrier is provided for positioning in a radiation path of a light microscope, at which a first set of optical assemblies is arranged to generate structured illuminating light with different orientations. These optical assemblies generally represent gratings of various orientations. The optic carrier can therefore also be called a grating carrier.

In the prior art, gratings at an optic carrier are exchanged by rotating the optic carrier. This way, only one of the present gratings in the radiation is present in the radiation path of the light microscope at any given time. Here it is disadvantageous that an exchange between different grating orientations is relatively time consuming. This period, also called dead time, amounts typically to several hundred milliseconds in conventional optical arrangements and light microscopes.

In other optical arrangements of the prior art, the dead time for exchanging two grating orientations is relatively long, too. Additionally, conventional designs are frequently expensive with regards to mechanics, perhaps requiring high precision of positioning of mobile optic components, and also lead to undesired loss of intensity of the light beam.

An objective of the invention is providing an optical arrangement and a light microscope, by which in a simple design a rapid exchange is possible between various grating orientations in order to generate structured illumination light.

This objective is attained in the optical arrangement with the features of claim 1 and a light microscope with the features of claim 19.

Preferred embodiment variants of the optical arrangement according to the invention and the light microscope according to the invention are the objective of the dependent claims and are explained in the following description, particularly in the context with the figures.

An optical arrangement of the type mentioned at the outset includes an adjustable deflection device for a selectable deflection of a light beam to one of the optical assemblies and for deflecting a light beam, coming from these optical assemblies, in the direction of a sample to be examined.

The light microscope of the type mentioned at the outside has an optical arrangement according to the invention in a radiation path between the light source and the sample plane.

A fundamental idea of the invention is the fact that no motion of the grating itself, or even the optic carrier with the gratings, is necessary for inserting a certain grating into the radiation path of the light microscope. Due to the relatively large dimensions and weight of the gratings as well as the optic carrier, here any movement thereof is time consuming. This problem is aggravated in that the gratings must be positioned with high precision in order to adjust the grating phase shifts per grating orientation necessary for this microscopy method. According to the invention, in order to select a grating image, with a certain orientation, the movement of the grating can be omitted by selectively adjusting the radiation path of a light beam for illuminating the sample to one of the optical assembles at the optic carrier. The optical assemblies preferably comprise gratings, which are arranged in various orientations in reference to each other. Any mechanical movement is here only required in the direction of deflection, if at all.

The movements at the deflection device are considerably smaller than any movement of a grating into the radiation path or out of it, so that a grating selection can occur via the deflection device in a particularly short period of time.

Another core concept of the invention is that with the adjustable deflection device, the radiation path of a light beam coming from one of the optical assemblies can be influenced in a variable fashion. This way a radiation path of the light beam from the deflection device in the direction towards the sample to be examined can be independent of the selection of the optical assembly.

Due to the fact that the optic carrier as well as the optical assemblies fastened thereat can be embodied in a spatially fixed fashion, advantageously a relatively large number of optical assemblies is possible at the optic carrier without this negatively influencing the time frame for selecting one of the optical assemblies. This way, the first set of gratings with identical grating constants may show at least three, or also at least five or at least seven gratings. This way, high precision of measuring can occur with yet low dead times between any exchange of the gratings selected.

In light microscopes of the prior art, the necessary time for image recording is determined by a combination of image field rotators and gratings using the following parameters: rotations of the image field rotators to generate structured illuminating light of various orientations show an adjustment period of approximately 300 ms. At least 3 rotation settings must be approached. Additionally, images must be recorded for 3 phases of each orientation of the image field rotator and grating. Thus, 9 images must be recorded. The exposure time for recording an image of the sample amounts to 30 ms, for example. Accordingly, the overall measuring period comprises in prior art approximately 3*300 ms (rotation of the grating image)+9*30 ms (exposure time)+9*10 ms (phase shift over Piezo element), thus more than 1.2 seconds. Contrary thereto, the adjustment time of the deflection device according to the invention amounts to approximately 1 ms only. This leads to an overall measuring period of only 3*1 ms (selection of the grating orientation)+9*30 ms (exposure time)+9*1 ms (phase shift via deflection mirrors), thus less than 300 ms.

Preferably, each optical assembly of the first set of optical assemblies comprises one grating. They may show the same grating constants.

In order to generate structured illuminating light of various orientations, the gratings may be arranged in different orientations in reference to each other, which means rotary angles about the optic axis. Grating lines of various gratings are therefore relatively rotated in reference to each other.

Alternatively or additionally, here image field rotators may be provided behind the gratings. They rotate the image of the respectively corresponding grating. This way, all gratings may be arranged in the same orientation, this means showing parallel grating vectors. Here, a grating fastening may be embodied in a simple mechanical fashion, under certain circumstances.

When using image field rotators as the optical assemblies at the optic carrier, in principle a single grating may be sufficient when it is arranged in the radiation path upstream in reference to a deflection device. Any light diffracted by the grating can then be guided to various radiation paths, in which image field rotators are arranged as optical assemblies. With these assemblies differently rotated grating images are generated at the sample plane.

In an embodiment of the optical arrangement according to the invention, at least one of the following optical assemblies is arranged at the optic carrier:
at least one additional set of gratings for generating structured illuminating light, with another set of gratings respectively showing at least three gratings, which show the same grating constant and are particularly arranged in different angles in reference to each other, with the various sets of gratings differing in their grating constants,
additional image field rotators for generating differently oriented grating images, with a grating being arranged in the radiation path upstream in reference to the deflection device and it being possible to selectably conduct any light coming from this grating via the deflection device to an image field rotator,
a return deflector for providing a wide field illumination, with it being possible to guide a light beam coming from the deflection device with the return deflector back to the deflection device, and
a window allowing the light beam to pass through, which comes from the deflection device, with radiation guiding means being provided to guide the light beam allowed to pass to the deflection device.

Conventional optical arrangements generally use only one grating of a single grating constant, because in these embodiments a larger number of gratings leads either to a disproportionately complicated design or to increase dead times during the change of gratings. Contrary thereto, in the optical arrangement according to the invention additional sets of gratings may be present with different grating constants, without this resulting in any significantly increased production expense or dead times. In multi-colored measurements therefore that set of gratings may be selected, which shows the most suitable grating constant for the respective wavelength excited. Various sets of gratings may also be selected by providing several exchangeable optic carriers. An exchange between these optic carriers may be advantageous, for example when the experiment is altered. Due to the fact that here the required exchange period between the optic carriers is of lesser importance, the exchange may occur manually or by a motorized displacement of the optic carriers.

When a reverse mirror or a window is provided at the optic carrier, a more rapid change is possible to an unstructured illumination light. This way, in addition to the examination with structured illumination on a sample image with wide-field illumination, particularly a wide-field epi-illumination can be recorded.

When transmission gratings are used, preferably a window is provided to embody a wide-field illumination. This window may be formed, for example, by a platelet with planar levels, a lens, a group of lenses, or a hole. The radiation guidance means arranged behind the windows for conducting the light beam to the deflection device may, for example, comprise one or more reflectors, lenses, or groups of lenses, as well as a rotational output mirror, which is rotated depending on the adjustment of the deflection device. Preferably, the output mirror is embodied as the back side of a deflection mirror of the deflection device, so that the output mirror and the deflection mirror can be rotated jointly.

In one embodiment of the gratings, the use of a reverse mirror is preferred as a reflection grating for providing a wide-field illumination. It may show a planar or also a curved surface.

Additionally, further sets of gratings may be present at the optic carrier, with respectively one plate with a defined thickness being arranged in front therefore for adjusting the focus. When plates of different thicknesses are provided at various gratings, the depth-related scanning can occur in discrete steps thereby.

It is preferred that the gratings are positioned in a two-dimensional arrangement side-by-side on the object carrier. Using the deflection device, here an impinging light beam can be deflected to an arbitrary grating according to a direction of deflection. When additional optical assemblies are provided at the optic carrier, they are also positioned in the two-dimensional arrangement. In principle, the gratings may also be arranged in a single straight or curved line; however by a two-dimensional arrangement advantageously the differences in the deflection angles to select a grating are smaller for a predetermined number of gratings. With smaller differences in the deflection angles, on the one hand smaller optics may be used, on the other hand the differences are lower in the paths of a light beam from the deflection device to the various gratings. This way it can be largely avoided that only some of the gratings are positioned in an intermediate image level of the light microscope, for example, while the other gratings are located outside the intermediate image level.

In order to further reduce the differences in the paths from the deflection device to the various gratings, additionally, the gratings may be offset in reference to each other in the direction of propagation of a light beam coming from the deflection device. This offset may be selected precisely such that all light paths are of identical length from the deflection device to the gratings. This way, a precise arrangement of all gratings is possible in an intermediate image level.

The deflection device may generally comprise arbitrary, quickly switched means for a variable adjustment of a direction of deflection, for example an acousto-optical device or a rotational or displaceable light-diffracting device.

Rapid switching is achieved with a deflection device having a deflection mirror. This can also be called a scanning mirror and for example, be embodied by a MEMS-scanner. Here, MEMS represents micro-electromechanical system. This scanning mirror may represent the only mobile element to select a grating. Beneficially, here electronic control means are provided and embodied to conduct the light beam to a desired grating or in order for another optical assembly to rotate and/or displace the deflection mirror. In principle, two deflection mirrors may also be provided behind each other, allowing a selection from a larger number of gratings.

Deflection mirrors offer the advantage that the component to be moved is relatively small and thus can be moved rather quickly.

In a variant of the embodiment of the optical arrangement according to the invention the gratings represent reflection gratings for returning an impinging light beam to the deflection mirrors. Thus, the same deflection mirror also deflects the returning light beam. Due to the dual deflection, under certain circumstances, minor imprecisions in positioning of the deflection mirror can be compensated.

When a deflection mirror is used in a Descan-arrangement, which means it conducts a light beam to the optic carrier and back therefrom, the radiation paths of the incoming and outgoing light beam can also coincide on the side of the deflection mirror, facing away from the optic carrier. In particular, in this case, a beam splitter may be provided for conducting a light beam, which originates in a light source of the light microscope, in the direction towards the deflection device and for guiding a light beam, coming from the deflection device, in the direction towards a sample to be examined.

In general, the beam splitter may be of an arbitrary type, and for example, comprise a colored beam splitter or a beam splitter with spatially different transmission and reflection features. However, the beam splitter preferably represents a polarization beam splitter.

In order to allow at the polarization beam splitter to differentiate between light beams, originating in the light source of the light microscope, from light beams coming from the deflection device, preferably means changing polarity are arranged between the polarization beam splitter and the optic carrier. The means changing polarity may, for example, represent a $\lambda/4$-plate or a $\lambda/2$-plate.

Alight beam originating in the light source of the light microscope shall impinge with a desired polarization the polarization beam splitter and here be forwarded to the deflection device and not directly guided in the direction of the sample. For this purpose, means influencing polarization can be used to adjust a certain direction of polarization between the light source and the polarization beam splitter. The means influencing polarization may show a polarizer or polarization filter and/or a $\lambda/2$-plate for changing a direction of polarization of a light beam originating in a light source according to the splitting features of the polarization beam splitter.

In another variant of the embodiment of the optical arrangement, according to the invention, the means influencing polarization can be switched, which are arranged in the radiation path in front of the polarization beam splitter. For example, they may show a switchable polarization filter or a rotational $\lambda/2$-plate. This way it can be selected if the light beam is guided from the polarization beam splitter to the deflection device or in the direction of the sample without impinging the deflection device.

When forwarding towards the deflection device the direction of polarization of the light is rotated by means of changing polarization between the polarization beam splitter and the optic carrier before the light returns back to the polarization beam splitter. Accordingly, in this case light is first transmitted at the polarization beam splitter and reflected when coming back, or vice versa, in order to finally reach the sample.

When forwarding occurs at the polarization beam splitter in the direction towards the sample, light is forwarded based on its direction of polarization not in the direction towards the deflection mirror but to a different radiation path. Here, via means changing polarization, the direction of polarization is rotated and the light is guided back to the polarization beam splitter.

For example, a $\lambda/4$-plate or a $\lambda/2$-plate may be used as a means changing polarization, followed by a reflector. Due to the reflector the $\lambda/4$-plate is passed tice, so that the direction of polarization of the light may be rotated by 90° when, coming from the reflector, it once more impinges the polarization beam splitter. Accordingly, in this case the light is first reflected at the polarization beam splitter and transmitted when coming back, or vice versa, in order to reach the sample. This way, the manipulation of the light beam by the grating is avoided. For example, a wide-field illumination can be provided, with any switching towards a structured illumination via the switchable polarization filter or the $\lambda/2$-plate being possible before the deflection device within a short period of time and with only minor loss of light. Alternatively, a rapid switching between structured illumination and wide-field illumination is possible in the described embodiments with reverse mirrors at the optic carrier.

When a polarization beam splitter is used, additional means changing polarization are arranged between the polarization beam splitter and the sample to be examined. In principle, here, the polarization changing effect can be compensated of the polarizer, upstream in reference to the beam splitter, and the means changing polarization, arranged between the beam splitter and the optic carrier. Thus, the polarization of a light beam at the time leaving the optical arrangement in the direction towards the sample may coincide with the polarization at the time of entering the optical arrangement. Preferably, these means changing polarization are embodied as rapidly switchable polarization rotators, for example with a rotational $\lambda/2$-plate or a switchable liquid crystal section. Electronic control means are provided and embodied such that they adjust the switchable polarization rotator to optimize a modulation contrast in a sample plane depending on the grating orientation of the presently selected grating.

As an alternative to the reflection gratings, here gratings provided at the object carrier may also represent transmission gratings. Instead of a Descan—use of the deflection mirror, here, it may be provided that the deflection device comprises a deflection mirror and an output minor such that with the deflection mirror a light beam originating at the light source of the light microscope, can be deflected to the optic carrier such that the gratings represent transmission gratings to allow a light beam, coming from the deflection mirror, to be deflected in the direction of the output mirror such that with the output mirror a light beam, coming from the optic carrier, can be deflected in the direction of the sample and that electronic control means are provided and implemented for the purpose to jointly rotate and/or displace the output mirror with the deflection mirror.

This way no beam splitter is necessary in order to spatially separate a light beam oriented in the direction of the optic carrier from a light beam coming from said object carrier.

In order to allow a rapid grating selection, the deflection mirrors and the output mirror are adjusted synchronously. This can be realized in a particularly effective fashion when the output mirror and the deflection mirror are fastened at a common fastening for a joint rotation or displacement, which fastening is rotated and/or displaced via the electronic control means. In order for the fastening with the two mirrors to comprise a low torque, the output mirror is formed preferably as the back of the deflection mirror.

Particularly flexible applications are possible in embodiments of an optic arrangement according to the invention, in which the gratings and other optical assemblies are held at the optic carrier in an exchangeable fashion and/or an optic carrier fastening is provided for an exchangeable fastening of the optic carrier. This way, the optic carrier can be equipped with those gratings, which are suitable for the respective light source or light sources used. An exchangeable fastening can occur, for example, by a mechanic plug-in or screwed connection or by a magnetic fixation.

Additionally, variants of the embodiment of the optical arrangement according to the invention are preferred, in which optic focusing means are provided between the deflection device and the optic carrier, in order to guide the respective light beams under identical angles to the respective grating or other optical assemblies of the optic carrier for the various deflection angles of the deflection device. The optic focusing means may particularly represent one or more lenses or groups of lenses. In principle, reflectors or a combination of lenses and reflectors may be used as well. The optic focusing means serve here also for a deflection of a light beam coming from the deflection device. This way, the light beams can extend parallel in reference to each other between the optic focusing means and the optic carrier, independent from the angle of deflection of the deflection device.

Preferably, a light beam is guided by the optic focusing means with its primary direction of propagation being perpendicular in reference to the selected grating. Preferably, light beams are guided with various deflection angles to the same lenses and/or reflectors of the optic focusing mean, however at various sections thereof. Preferably, here a cross-section of the lenses and/or reflectors of the optic focusing means is at least twice as large as the cross-sectional area of the diameter of the light beam at the optic focusing means. Light beams impinging the optic focusing means at various deflection angles can this way be guided and spatially distanced parallel in reference to each other to the optic carrier.

Preferably, the optic focusing means and the deflection device are arranged such that a light beam, reflected by one of the gratings or another optic component, is forwarded by the optic focusing means to the deflection device and further in the direction towards the sample. This way, the optic focusing means also performs a deflecting function when returning a light beam, depending on the angle of deflection of the deflection device.

Another improvement regarding the speed of recording images can be achieved when a certain sample section is displayed successively on various camera sections of a camera. With every selection process of the camera, here, several images of the sample are scanned, which were generated successively on different camera sections.

In this embodiment, at least one camera is provided for recording an image of a section of a sample and a scanning reflector is arranged between the sample plane and the camera. Electronic control means are implemented to display with the scanning reflector the same sample section successively on various sections of the camera.

The scanning reflector may be embodied similar to the deflection mirror in front of the object carrier. Additionally, optic focusing means may also be provided between the scanning reflector and the camera, which similarly to the optic focusing means can be embodied between the deflection mirror and the optic carrier.

Beneficially, the electronic control means are implemented in order to switch the scanning reflector and the deflection mirror at the same points of time. For example, images can be generated on the various camera sections concerning various optic assemblies at the optic carrier.

By the division into several camera sections for each sample image, here, only a portion of all available image pixels of the camera is utilized. Beneficially it may be provided here that a smaller sample section is illuminated than when operating in a manner in which all image pixels of the camera are used to display a single sample image. The illumination of this smaller sample section can be achieved when at least one additional return reflector is provided at the object carrier, with its reflecting section being smaller than in the above-described return reflector. By the fact that the object carrier is arranged in an intermediate image level, only those reflecting sections are displayed in the sample plane and consequently only a smaller sample section is illuminated. This section focused on can also be called region of interest.

In an appropriate fashion, additional gratings and/or windows may be provided at the object carrier, with their widths and/or heights being lower than the other gratings and/or other windows.

The readout time of the camera can also be reduced when only a portion of all image pixels of the camera is being evaluated.

Additionally, a focusing optic or a collimator may be provided for guiding the light beam to the deflection device. Preferably, the electronic control means are arranged for displacing the focusing optic in the direction of propagation of the incident light and/or for adjusting the focal point of the focusing optic. This way an axial displacement of the focal point of the light can be achieved. Alternatively, an axial displacement can also be achieved by the deflection device, the object carrier, as well as all components located there between being displaced jointly in the direction, in which light impinges the deflection device.

The electronic control means may also be embodied in order to displace the deflection device and the focusing optic jointly in the direction of extension of the impinging light beam. For example, a focal point of the light may be laterally displaced in a pupil level of the light microscope. This may occur depending, for example, on the selection of a lens at the light microscope.

By a displacement of the light beam in the lens pupil, for example, a suitable illumination can be adjusted for the internal total reflection—fluorescence microscopy (TIRF). For this method of microscopy, it may additionally be advantageous if one of the optical assemblies is an image field rotator at the optic carrier.

With each grating position a phase shift can occur. This shall be understood as a shift of the illustration of the grating in the sample plane perpendicular with reference to a direction of the grating lines. The shifting can beneficially be smaller than a distance between adjacent grating lines. In order to change a structured illumination, which is generated with one of the gratings, accordingly an actuator or motor may be provided to move the grating. The actuator may represent, for example a Piezo-electric actuator, allowing a position control in two dimensions. Preferably all gratings are arranged in a common fastening and said fastening can be moved via the motor. For example, a single motor or a Piezo-electric actuator is sufficient for moving all gratings.

In order to shift phases of each grating position, alternatively or additionally electronic control means may also be provided to shift or tilt the deflection mirror. For example, light can be conducted successively in at least three different deflection angles to the same grating. Furthermore, a phase shift can be achieved such that an optic-diffractive means are provided between the deflection device and the optic carrier and the electronic control means is provided and implemented for the motorized movement of the optic-diffractive means to change a structured illumination provided with one of the gratings. The optic-diffractive means may represent, for example, a plate or a rocking plate, which is tilted via the electronic control means, or a wedge, which is displaced via the electronic control means.

The displacement or tilting occurs in a direction by which the light beam at the grating is shifted in a direction perpendicular to the direction of the grating lines.

In a preferred variant of the embodiment of the light microscope, according to the invention, the optic carrier is arranged in an intermediate image level or a level of the light microscope conjugated in reference thereto. Thus, a focused display occurs of the selected grating in the sample plane.

BRIEF DESCRIPTION OF THE DRAWINGS

In the following, additional advantages and features of the invention are described with reference to the attached schematic figures. Here it shows.

DESCRIPTION OF THE EMBODIMENTS

Identical components or those with identical effects are generally marked in the figures with the same reference character.

Figure 1:
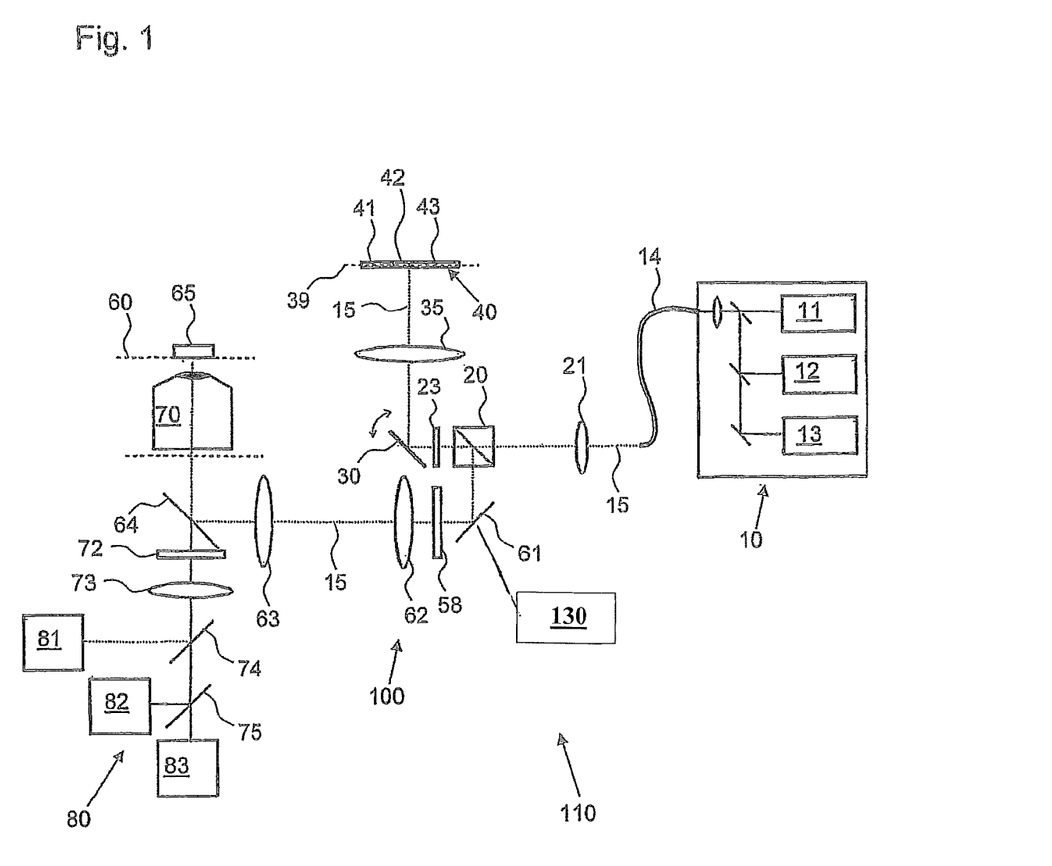
FIG. 1 is a schematic illustration of an exemplary embodiment of a light microscope according to the invention with an optical arrangement according to the invention.

FIG. 1 shows schematically an exemplary embodiment of a light microscope 110 according to the invention. The light microscope 110 comprises as essential components a light source 10 for emitting illuminating light, an optical arrangement 100 according to the invention for generating structured illumination, a sample plane 60, at which a sample 65 can be positioned, and a detector device 80.

In the present example, the light source 10 comprises several laser modules 11, 12, 13, which can emit light of various wavelengths. Via beam splitters, which are dependent on wavelengths, the light beams of these laser modules 11, 12, 13 can be guided to a common beam path and for example, via a fiber optic 14 to the optical arrangement 100.

The optical arrangement 100 comprises as central elements a deflection device 30 and an optic carrier 40. Here, several gratings 41 to 43 are arranged in various orientations in reference to each other. With the deflection device 30 a light beam 15, which originates in the light source 10, can be forwarded selectably in various angles of deflection towards the optic carrier 40 such that the light beam 15 impinges one of the gratings 41 to 43 depending on the angle of deflection. Preferably, the deflection device 30 comprises for this selection a deflection mirror 30, which is rotational via electronic control means 130 of the optical arrangement 100. In principle it is also possible that the deflection mirror 30 is formed from several mirrors arranged side-by-side, with their direction of deflection being adjusted jointly.

Unlike prior art, no displacement of the grating is required for the selection of a grating. Instead, a radiation path of the light beam 15 is altered. Due to the fact that the deflection device 30 only needs mobile components with small dimensions and sizes for this purpose, the time required for changing the selected grating, i.e. for adjusting the angle of deflection, is particularly short. The deflection mirror 30 preferably comprises a micro-electromechanical system (MEMS), which can particularly quickly switch between various states.

It is preferred that a light beam or a radiation bundle 15 with its primary direction of propagation impinges one of the gratings 41 to 43 perpendicularly, regardless of the grating 41 to 43 selected. Therefore, an incident angle of the light beam 15 upon the gratings 41 to 43 shall be independent from the angle of deflection of the deflection device 30. This is achieved with optical focusing means 35, which are arranged between the deflection device 30 and the optic carrier 40. The optic focusing means 35 may comprise one or more lenses arranged successively or side-by-side, which show overall a light-bundling effect. Depending on the angle of deflection a radiation bundle 15 passes the optic focusing means 35 in various sections, rendering the optic focusing means 35 to cause, in addition to a light bundling effect, also a change of direction depending on the angle of deflection. Preferably, the deflection device 30 is positioned in a focusing area of the optical focusing means 35. Accordingly, the radiation bundles 15 extend between the optical focusing means 35 and the optic carrier 40 for various angles of deflection of the deflection device 30, essentially parallel and offset in reference to each other.

In the variant of the embodiment shown, the same deflection mirror 30 is used for guiding light 15 to the object carrier 40 and also for guiding the light 15 from the optic carrier 40 back and further in the direction towards the sample 65. In order for the light 15, which comes back from the object carrier 40, to be forwarded via the deflection device 30 not to the light source 10 but to the sample 65, here a beam splitter 20 is arranged in the radiation path between the light source 10 and the deflection device 30. In the example shown, the beam splitter 20 is a polarization beam splitter. Light 15 returning from the deflection device 30, based on the means changing polarization 23 arranged between the polarization beam splitter 20 and the optic carrier 40, shows an altered polarization and is forwarded by the polarization beam splitter 20 in the direction towards the sample 65.

Here, the light 15 passes through polarization changing means 56 (see FIG. 2) which can be switched quickly. They are embodied as polarization rotators 58, for example as $\lambda/2$-plates or preferably as a switchable liquid crystal section, which can be switched within few milliseconds to change the direction of polarization of the transmitted light 15. Using electronic control means 130 the polarization rotator 58 can adjust a direction of polarization depending on the respectively selected grating 41 to 55 (see FIG. 2). This way the modulation contrast is optimized in the sample plane.

In order to change an axial focal point of the light 15, electronic control means 130 may be implemented to displace the focusing optic 21, which is arranged upstream in reference to the beam splitter 20, in the direction of propagation of the incident light 15. Alternatively, the deflection mirrors 30, the optic focusing means 35, and the optic carrier 40 may be displaced jointly in the same direction.

A lateral displacement of the light 15 in the lens pupil can be achieved by displacing the focusing optic 21 and the deflection mirror 30 jointly in the direction of propagation of the incident light 15.

Light 15, forwarded by the polarization beam splitter 20 in the direction towards the sample 65, is guided via additional optical elements 61 to 64 into a lens 70, which focuses the light 15 as an illuminating light on the sample plane 60.

Herein, a sample 65 can be held, which emits detection light. Said light is guided via the lens 70 to a beam splitter 64, which spectrally separates illumination light from detection light. The detection light is guided via additional optical elements 72 and 73 to a detector device 80. In the example shown the detector device 80 comprises several cameras 81, 82, 83, to which the detection light is forwarded depending on its wavelengths using dichroitic beam splitters 74, 75.

In the example shown, the sample can be impinged successively with structured illuminating light of various wavelengths. Additionally, several images must be sequentially recorded for each wavelength for the use of the structured illumination. In spite of this high number of images to be recorded the necessary time required is particularly short due to the optic arrangement 100 comprising the deflection mirror 30 and the optic carrier 40.

Figure 2:
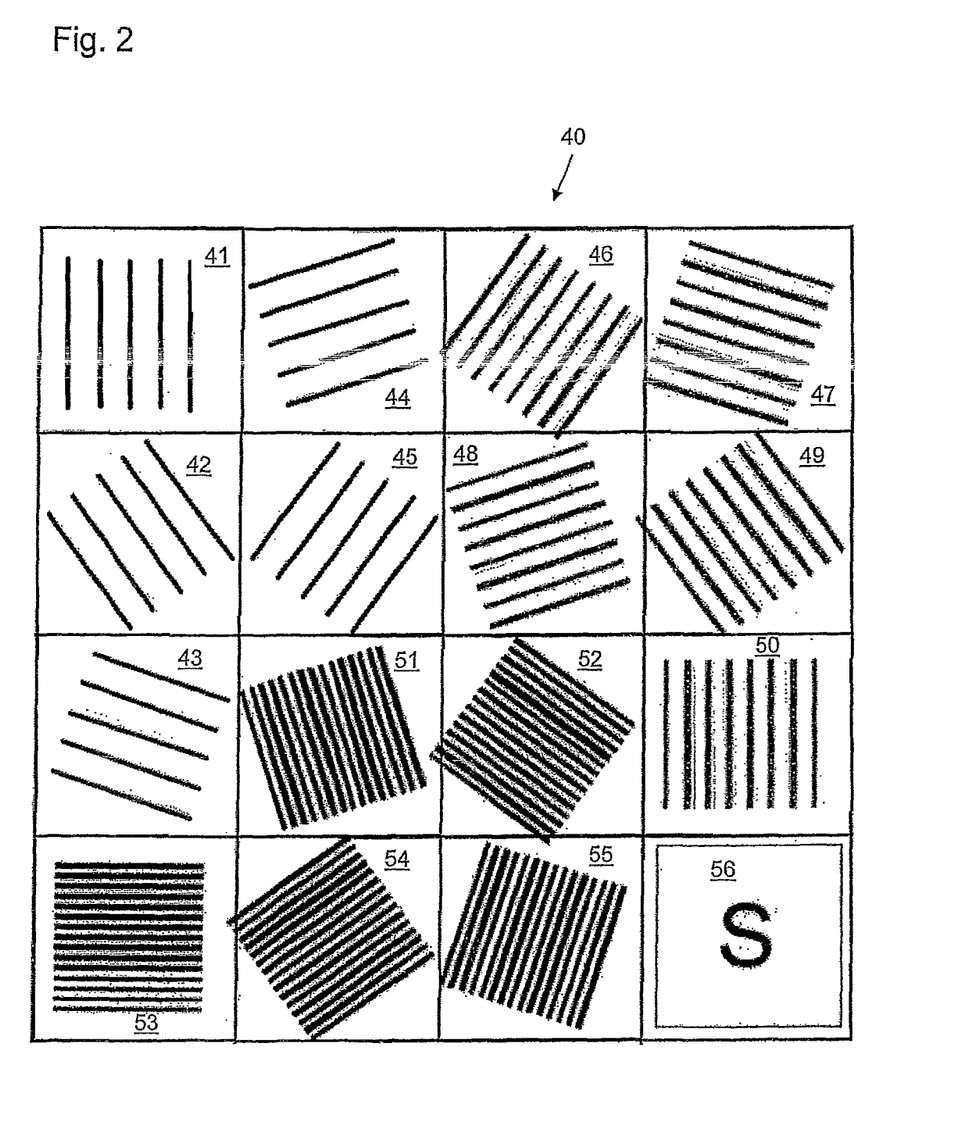
FIG. 2 is a schematic illustration of an optic carrier of the optical arrangement of FIG. 1.

An exemplary embodiment of an optic carrier 40 is shown schematically in FIG. 2. Various gratings 41 to 55 are provided at the optic carrier 40 to generate a structured illumination as well as a return reflector 56 to providing a wide field illumination. In this embodiment, the gratings 41 to 55 represent reflection gratings, in order to return the incident light beam as structured illumination back to the deflection device.

Alternatively, the gratings may also represent transmission gratings. In this case, a window is used instead of the return reflector in order to provide wide field illumination.

The gratings 41 to 55, as well as the return reflector 56, are positioned directly side-by-side in a two-dimensional arrangement. This way, even minor changes of the angle of deflection can be selected in two dimensions for each of these optical assemblies 41 to 55.

In the case shown, several sets of gratings are provided, which differ in their grating constants, i.e. their linear distances. A particular set of gratings is selected depending on the wavelength of the illuminating light used. A first set with the gratings 41 to 45 shows wide linear distances, a second set with the gratings 46 to 50 shows moderate linear distances, and a third set of gratings 51 to 55 is formed with low linear distances.

The gratings within a set show various orientations in reference to each other, so that a structured illumination can be generated in various directions for each of the above-mentioned linear distances.

Preferably, the optic carrier 40 is mounted at a fastening in an interchangeable fashion such that during a change of the wavelength of the illumination light also the set of gratings can be exchanged with a suitable grating constant.

Figure 3:
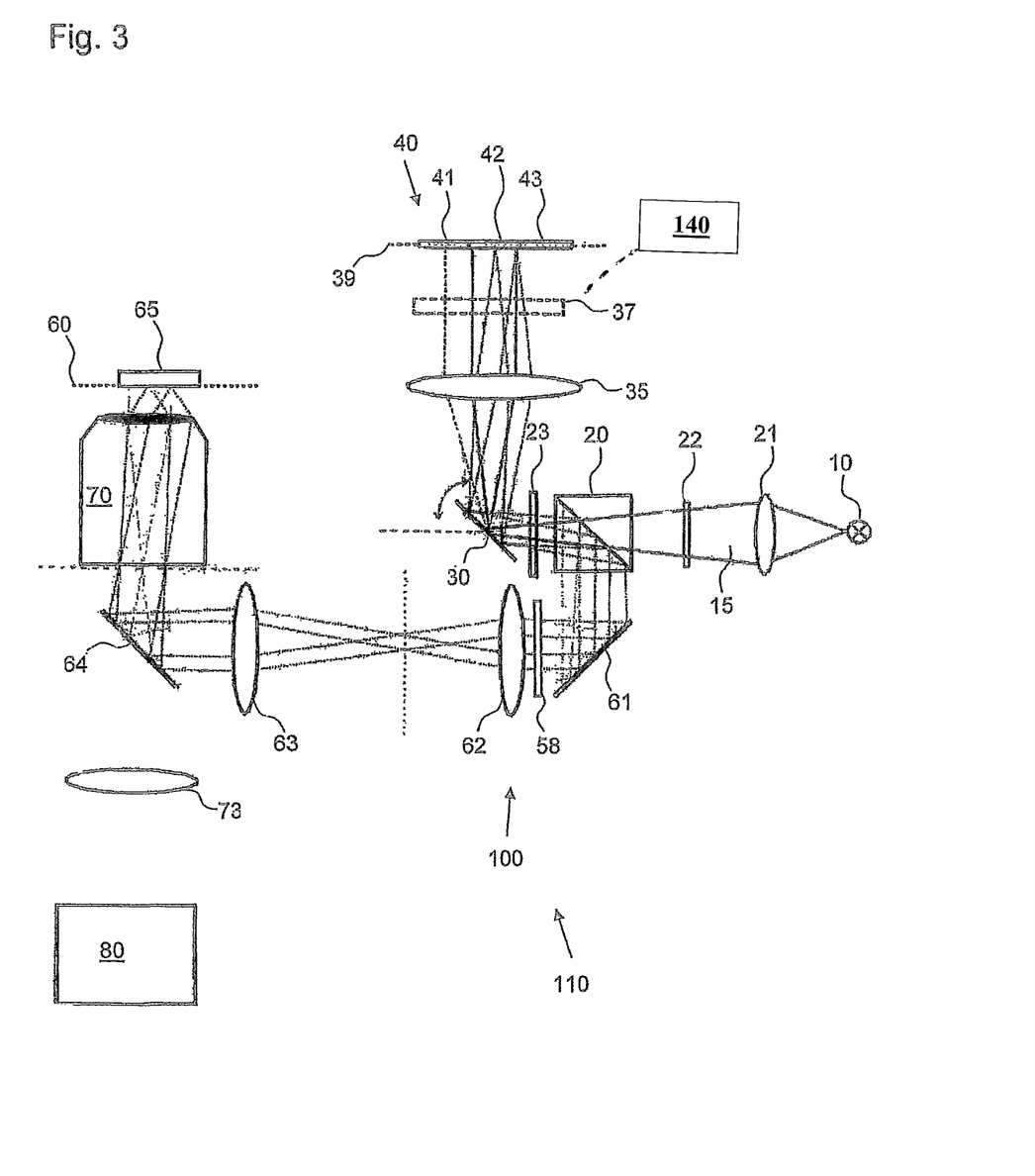
FIG. 3 is a schematic illustration of another exemplary embodiment of a light microscope according to the invention with an optical arrangement according to the invention.

Another exemplary embodiment of a light microscope 110, according to the invention, is schematically shown in FIG. 3. Here, a light source 10 is used, which emits non-polarized light. It is polarized with a polarizer 22 such that it is forwarded by the polarization beam splitter 20 to the optic carrier 40. In this embodiment, an optic-diffractive means 39 is arranged in front of the optic carrier 40 and preferably behind the optic focusing means 35. It is connected to a motor, not shown, and can be moved in order to change a structural illumination using the very same grating. The light microscope 110 additionally comprises electronic control means 140, which are implemented to move the optic-diffractive means 37 at various positions, recording an image of the sample 65 for each of these positions, and calculating these images into an image of the sample. The optic-diffractive means 37 may represent a wedge, for example, which is displaced by the motor. Alternatively, a rocking plate can be used with planar-parallel surfaces, which is tilted by the motor.

In addition or as an alternative to the optic-diffractive means 37, here, a particularly quick phase shifting can occur via deflection mirrors 30. For this purpose, electronic control means rotate the deflection mirror 30 such that a certain grating is displayed successively and offset in the sample plane 60. One image of the sample 65 is recorded for each of these positions of the deflection mirror 30.

FIG. 3 shows a radiation path of the light beam 15 for a first angle of deflection of the deflection device 30 in continuous lines, which deflection device guides the light beam 15 to the grating 42. A radiation path for another angle of deflection is indicated in dot-dash lines, by which the light beam is guided to the grating 41. The gratings are arranged in an intermediate image level 39 such that they are displayed in the sample plane 60 in a focused fashion.

Two radiation paths are also indicated, which originate in different points at the object carrier 40 and are focused accordingly on two different points in the sample plane 60.

In the embodiments of FIGS. 1 and 3, the gratings 41-55 at the optic carrier represent reflection gratings. Alternatively, the gratings 41-55 may also represent transmission gratings. In this case, radiation guidance means are provided for guiding light, which has passed through the transmission gratings, to the lens 70, particularly to the reflector 61. In order to combine various radiation paths through the transmission gratings on a common radiation path to the lens 70, the radiation guidance means comprise radiation onto combination means, for example a rotational output reflector. This is rotated dependent on the direction of deflection of the deflection mirror. In particular, the output mirror may form a back of the deflection mirror and can be rotated together with it about a common axis of rotation. The components 20, 22, and 23 in FIGS. 1 and 3 may be omitted in this embodiment.

With the optical arrangement 100, according to the invention, and the light microscope 110 according to the invention, it can be alternated in a particularly short period of time between various grating settings for a structured illumination as well as for an adjustment of wide field illumination. Additionally, in a simple fashion a large number of gratings with various local orientations and grating constants can be provided, without this resulting in any interference with the radiation quality.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE CHARACTERS

10 Light source
11, 12, 13 Laser module
14 Fiber optic
15 Light beam
20 Beam splitter
21 Focusing optic for focusing on the deflection device
22 Polarizer
23 means changing polarization
30 deflection device, deflection mirror
35 optic focusing means
37 rocking plate or wedge
39 intermediate image level
40 optic carrier
41-56 optical assemblies
41-45 first set of gratings
46-50 second set of gratings
51-55 third set of gratings
56 return reflector
58 switchable means changing polarization
60 sample plane
61 reflector
62, 63 lens or group of lenses
64 beam splitter for separating inciting light from detection light
65 sample
70 lens
72 optic element
73 lens or group of lenses
74, 75 dichroitic beam splitter
80 detector device
81, 82, 83 cameras
100 optical arrangement
110 light microscope
130 electronic control means
140 electronic control means

What is claimed is:

1. An optical arrangement for positioning in a radiation path of a light microscope, said arrangement comprising an optic carrier, a first set of optical assemblies having multiple diffraction gratings arranged at said optic carrier for generating structured illumination light of different orientations, an adjustable deflection device provided for selectable deflection of an unstructured light beam to one of said diffraction gratings and for deflecting a light beam, coming from said selected diffraction grating into the direction of a sample to be examined.

2. The optical arrangement according to claim 1, wherein said multiple diffraction gratings have identical grating constants and various grating orientations.

3. The optical arrangement according to claim 1, wherein said first set of diffraction gratings comprises several image field rotators for generating structured illumination light of said different orientations from incident structured illumination light.

4. The optical arrangement according to claim 1, wherein at least one of the following optical assemblies is arranged at the optic carrier:
   (a) at least one additional set of diffraction gratings for generating structured illumination light, with an additional set of diffraction gratings each comprising at least three gratings, which have the same grating constant and are arranged in different angles with reference to each other, with the various sets of gratings differentiating in their grating constants;
   (b) image field rotators for generating differently oriented grid illustrations, with a grating being arranged in the radiation path upstream in reference to the deflection device and with it being possible to guide light, coming from this grating, via the deflection device in a selectable fashion to the image field rotators;
   (c) a return reflector for providing a wide field illumination, with it being possible to guide a light beam coming from the deflection device via the return reflector back to the deflection device;
   (d) a window for allowing the light beam to pass, which comes from the deflection device, with radiation guiding means being provided to guide the light beam, which was allowed to pass, to the deflection device.

5. The optical arrangement according to claim 1, wherein the optical assemblies are positioned in a two-dimensional arrangement side-by-side on the optic carrier.

6. The optical arrangement according to claim 1, wherein the deflection device comprises a deflection mirror, electronic control means being provided and embodied to guide one of said light beams to a desired selected grating or another optic assembly in order to rotate and/or displace the deflection mirror.

7. The optical arrangement according to claim 6, said electronic control means being implemented to guide one of said light beams together with the deflection mirror successively for various angles of deflection to the same grating in order to achieve a geometric shift of the light pattern in the sample plane.

8. The optical arrangement according to claim 1, wherein the optic assemblies are reflection gratings to return an incident light beam to the deflection device.

9. The optical arrangement according to claim 1, wherein the deflection device comprises a deflection mirror and an output reflector, and wherein a selected one of said light beams, originating in a light source of the light microscope, can be deflected to the optic carrier with said deflection mirror, said optic assemblies being transmission gratings for allowing said selected one of said light beams coming from the deflection mirror to pass in a direction to the output reflector, said selected one of said light beams coming from the optic carrier being deflected in a direction to the sample, and wherein electronic control means are provided and implemented to rotate and/or displace the output reflector with the deflection mirror.

10. The optical arrangement according to claim 9, wherein the output reflector and the deflection mirror are fastened at a common fastening for a joint rotation or displacement, which fastening can be rotated and/or displaced via the electronic control means.

11. The optical arrangement according to claim 1, further comprising a beam splitter provided for guiding one of said light beams, originating in a light source of the light microscope, in a direction towards the deflection device and for guiding said one of said light beams, coming from the deflection device, in a direction of the sample to be examined.

12. The optical arrangement according to claim 11, wherein said beam splitter is a polarization beam splitter.

13. The optical arrangement according to claim 12, further comprising means for influencing polarity arranged in the radiation path upstream with reference to the polarization beam splitter for adjusting a direction of polarization of said one of said light beams, said means for influencing polarization being switchable to select if the light beam is guided from the polarization beam splitter to the deflection device or in a direction of the sample without impinging the deflection device.

14. The optical arrangement according to claim 1, wherein said gratings are held exchangeably at the optic carrier and/or an optic carrier fastening is provided for an exchangeable fastening of the gratings and said optic carrier.

15. The optical arrangement according to claim 1, further comprising an optic focusing device located between the deflection device and the optic carrier in order to guide said light beams for various deflection angles of the deflection device under identical angles to the respective grating of the optic carrier.

16. The optical arrangement according to claim 1, further comprising an adjustment element provided to move the multiple gratings for a geometric shift of a light pattern of a structured illumination generated with one of the gratings.

17. The optical arrangement according to claim 1, further comprising a focusing optic provided for guiding said light beams to the deflection device, so that the deflection device and the focusing optic can be laterally displaced in the direction of propagation of said light beams in order to achieve a focused position of said light beams in a pupil plane of the light microscope.

18. The optical arrangement according to claim 1, further comprising an optic-diffractive means located between the deflection device and the optic carrier, and electronic control means provided and implemented for a motorized movement of the optic-diffractive means in order to change the structured illumination provided by one of the gratings.

19. A light microscope comprising a sample plane in which a sample to be examined can be positioned, at least one light source for emitting a light beam in the direction of the sample plane, an optical arrangement according to claim 1 located in a radiation path between the light source and the sample plane.

20. The light microscope according to claim 19, wherein the optic carrier with said gratings are arranged at an intermediate image plane of the light microscope.

21. The light microscope according to claim 19, further comprising at least one camera provided for recording an image of a sample area, a scanning reflector being arranged between the sample plane and the camera, and electronic control means being arranged in order to display with the scanning reflector the same sample section successively on various sections of the camera.

* * * * *

UNITED STATES PATENT AND TRADEMARK OFFICE
CERTIFICATE OF CORRECTION

| | |
|---|---|
| PATENT NO. | : 9,671,603 B2 |
| APPLICATION NO. | : 14/427276 |
| DATED | : June 6, 2017 |
| INVENTOR(S) | : Thomas Kalkbrenner, Ralf Netz and Ingo Kleppe |

It is certified that error appears in the above-identified patent and that said Letters Patent is hereby corrected as shown below:

In the Specification

Column 1, Line 19: should insert title heading between Line 19 and Line 20 --BACKGROUND OF THE INVENTION--

Column 1, Line 36: should delete title heading "BACKGROUND OF THE INVENTION"

Column 2, Line 13: should insert title heading between Line 13 and 14 --DETAILED DESCRIPTION OF THE INVENTION--

Column 2, Line 28: now reads: "outset includes an adjustable deflection device for a select-"
should read --outset includes an adjustable deflection device for select- --

Column 2, Line 33: now reads: "The light microscope of the type mentioned at the outside"
should read --The light microscope of the type mentioned at the outset--

Column 5, Line 66: now reads: "Alight beam originating in the light source of the light"
should read --A light beam originating in the light source of the light--

Column 6, Line 56: now reads: "principle, here, the polarization changing effect can be"
should read --principle, here the polarization changing effect can be--

Column 7, Line 7: now reads: "mirror, here, it may be provided that the deflection device"
should read --mirror, here it may be provided that the deflection device--

Column 7, Line 8: now reads: "comprises a deflection mirror and an output minor such that"
should read --comprises a deflection mirror and an output mirror such that--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*